United States Patent [19]
Swanson

[11] 3,759,280
[45] Sept. 18, 1973

[54] PIPE TO MANHOLE SEAL

[75] Inventor: Harold V. Swanson, Morris Plains, N.J.

[73] Assignee: Interpace Corporation, Parsippany, N.J.

[22] Filed: May 24, 1971

[21] Appl. No.: 146,180

[52] U.S. Cl.............. 137/363, 52/21, 285/158, 285/236
[51] Int. Cl............................................. F16l 5/00
[58] Field of Search................. 285/158, 192, 236, 285/189, 200, 291; 61/11, 13; 277/12, 210, 209, 212 F; 24/279; 52/20, 21, 220; 137/363

[56] References Cited
UNITED STATES PATENTS

| | | | |
|---|---|---|---|
| 2,670,976 | 3/1954 | Owen............................. | 285/192 X |
| 2,410,999 | 11/1946 | Reisner......................... | 285/192 X |
| 2,874,441 | 2/1959 | Duane............................ | 24/279 |
| 2,867,453 | 1/1959 | Watts et al.................... | 285/291 X |
| 1,682,940 | 9/1928 | Smith............................. | 285/192 X |
| 3,406,988 | 10/1968 | Jones............................. | 285/237 X |

FOREIGN PATENTS OR APPLICATIONS

| | | | |
|---|---|---|---|
| 1,280,003 | 11/1961 | France........................... | 285/158 |
| 770,103 | 3/1957 | Great Britain................. | 285/236 |
| 300,709 | 9/1965 | Netherlands................... | 285/158 |
| 190,251 | 6/1964 | Sweden.......................... | 285/288 |

*Primary Examiner*—Dave W. Arola
*Attorney*—Charles E. Baxley, Frank M. Nolan and Thomas E. Tate

[57] ABSTRACT

A seal is here taught for use between a concrete side wall of a manhole installation and a pipe which penetrates through the side wall. Pipes for use in this service generally have rough cylindrical outer surfaces which are not truly round. The seal includes an elastomeric sleeve which is positioned about the outer surface of the pipe and which is clamped at one of its ends thereto. The sleeve is provided at its other end with an outwardly-flared flange. The flange may be attached to the wall by means of a firm annulus and bolts or the like. In a preferred embodiment the flange is cast into the wall and has corrugations to insure good bond therewith. The sleeve can be positioned within the hole, out of harms way, while the concrete wall is being poured.

5 Claims, 5 Drawing Figures

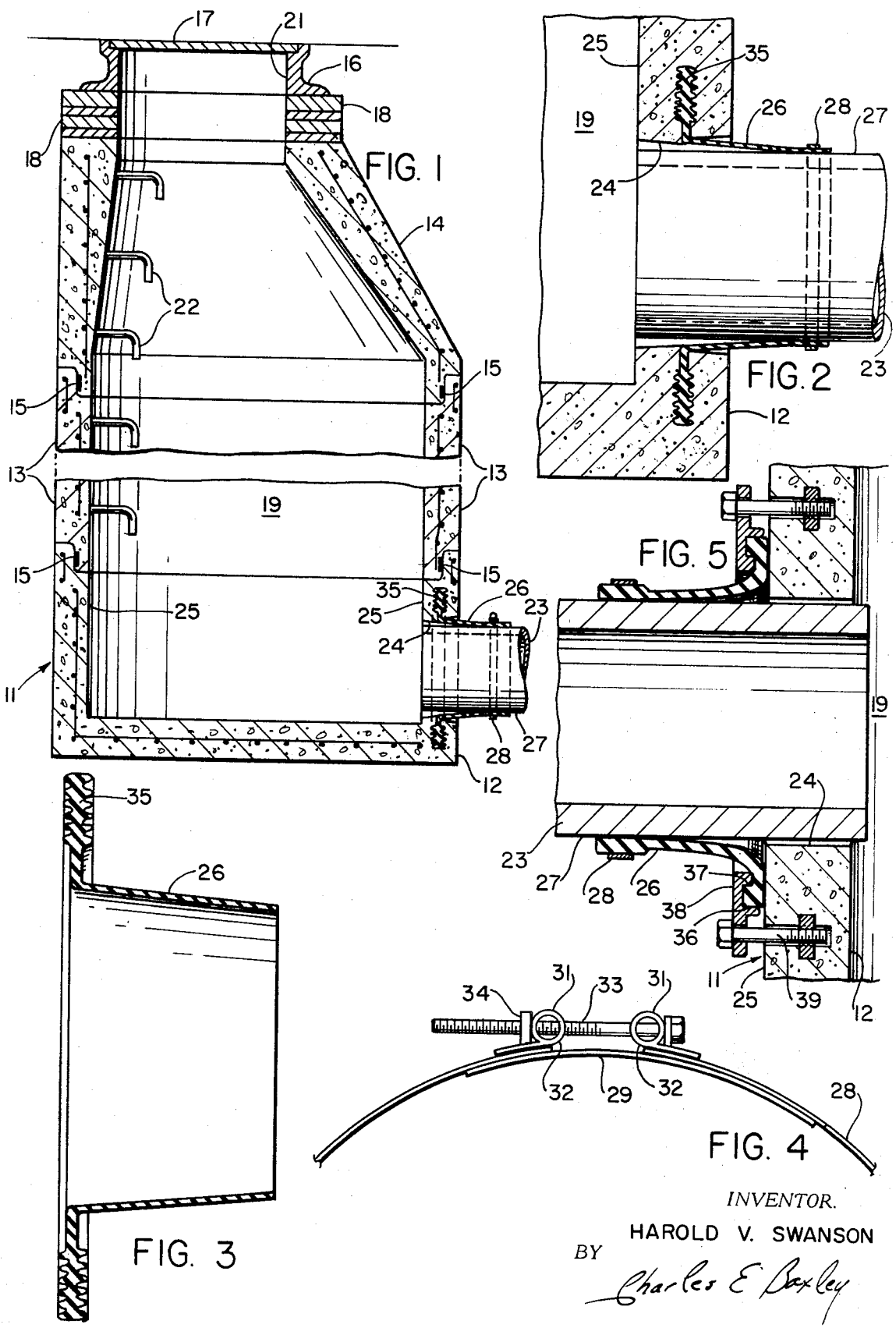

PIPE TO MANHOLE SEAL

BACKGROUND OF THE INVENTION

This invention relates to a seal between a fluid-conveying underground pipe and a fluid-distributing structure. The invention is directed particularly to sealing between an underground concrete, clay, asbestos or plastic pipe (or the like) and a concrete manhole housing (or the like) with the pipe extending through the wall of the manhole housing.

One method used for sealing between an underground pipe and a manhole housing has been to seal an annular space around the pipe with cement and/or a packing material. These couplings generally have an annular member fitted closely to the pipe and require forcing of a packing into a confined space formed by a bell-shaped member and the interfitting pipe. Couplings of this type are illustrated in U.S. Pat. Nos. 2,087,752 and 2,657,079.

Another method used for sealing between an underground pipe and a manhole housing has been to bevel the wall and force an annular flange against a resilient (usually elastomeric) member, deforming the member and wedging it between the bevelled wall and the pipe to seal the opening. Couplings of this latter type are illustrated in U.S. Pat. No. 3,348,850.

SUMMARY OF THE INVENTION

Small-tolerence couplings may be satisfactory for precisely-formed pipes and parts, but they are unsuitable for conduit systems in which pipes have wide tolerances in roundness as well as roughness and often are positioned angularly in relation to openings through which they penetrate. Unsuitability is particularly evident in underground sewerage systems. Further, manhole housings are subject to pounding of passing vehicles and/or settling and/or tilting due to their sizes, weights and shapes. Also differential settlement between pipes and manhole structures may produce high shear forces on the pipes with consequent likelihood of damage to the pipes.

Another problem of small-tolerance couplings is excessive time required to seal an opening between a pipe and a manhole housing. The pipe and manhole housing are usually below ground and an excavation is subject to slides as well as filling with water. Time for completing the sealing should be as short as possible so as to minimize labor costs and hazards to workmen.

The foregoing problems of small-tolerance couplings also are applicable generally to installations wherein a resilient member is wedged between a bevelled wall and the pipe to seal the opening.

Applicant copes with the foregoing problems by means of a useful, novel and inventive approach. An elastomeric sleeve is provided with a first end adapted to be clamped in sealed relationship to the rough outer surface of the pipe. The sleeve has an outwardly-flared flange at its other end to be connected in sealed engagement to the wall. The flange may be bolted with a firm annulus to the wall. In a preferred embodiment the flange is cast into concrete wall and has corrugations to insure bonding with the concrete. In the preferred embodiment the elastomeric sleeve is positioned within the hole in the wall, out of harms way, while the concrete wall is being poured, cured, transported and the like. After the wall has been poured, the sleeve can be withdrawn from the hole in the wall for penetration by the pipe so that it is then in its operative position.

Accordingly, one object of this invention is to provide a pipe seal for a pipe having an irregularly-shaped rough outer surface.

Another object of the invention is to provide a pipe seal that permits angular insertion between a connecting pipe and the hole in the manhole wall receiving the pipe.

Still another object of the invention is to provide a seal of the character stated that is quickly and easily installed.

Still another object of the invention is to provide a seal of the character stated that can be cast into a manhole wall.

Still another object of the invention is to provide a seal of the character stated that is capable of deforming under effects of differential settlement between pipe and manhole structure to prevent development of damaging sheer stresses on the pipe.

Still another object of the invention is to provide a seal of the character stated that is suitable for a relatively wide variation in outside diameters of pipes.

Still another object of the invention is to provide a seal of the character stated that is economical, rugged, has a long life and is well suited otherwise to its intended function.

BRIEF DESCRIPTION OF THE DRAWINGS

The foregoing and other features will appear more fully from the following description of preferred embodiments viewed in conjunction with accompanying drawings wherein like numerals designate like parts and wherein:

FIG. 1 is a typical manhole base, riser and cone assembly to which the present invention pertains.

FIG. 2 is an enlarged detail of a pipe to manhole seal according to a preferred embbodiment of this invention.

FIG. 3 is an enlarged detail of a sleeve according to the embodiment of FIG. 2.

FIG. 4 shows a strap assembly for clamping the sleeve to an irregularly-shaped rough outer surface of a pipe.

FIG. 5 is an alternate embodiment of the present invention using a firm annulus and bolts to connect the flange to the manhole wall.

PREFERRED EMBODIMENTS

As seen best in FIG. 1, a reinforced concrete manhole installation (generally designated 11) includes base 12, risers 13 and cone 14 provided with rubber-gasketed joints 15 as well as cover frame 16 and cover 17. The elevation of cover 17 is adjustable by means of bricks 18 or the like. Access to manhole chamber 19 is via port 21 and ladder 22 accommodates entry and/or exit. underground As seen best in FIG. 2, one or more underground pipes 23 penetrate into chamber 19 via hole 24 in wall 25. Pipe 23 may be concrete, clay, asbestos or plastic (such as polyvinyl chloride) and has wide deviations in roundness and may have a rough outer surface. To seal pipe 23 with wall 25, sleeve 26 is connected in sealing engagement to outer surface 27 be means of strap 28 (seen in detail in FIG. 3). Strap 28 is provided with underlapping shoe 29 and scrolls 31 at its ends 32 which scrolls have holes through which threaded bolt 33 penetrates. Nut 34 is engaged threadably on bolt 33 for tigtening strap 28 about the sleeve in sealed engagement on outer surface 27.

For the embodiment shown in FIGS. 1-3, to complete sealing of pipe 23 with wall 25, sleeve 26 is provided with outwardly-flared flange 35 which may be cast into concrete wall 25 about hole 24. Sleeve 26 is made preferably of an elastomeric material (such as rubber) allowing its disposition (with the aid of suitable spacers and wrappings) in hole 24 while concrete wall 25 is being poured, cured, transported and the like. Thereafter, sleeve 26 may be withdrawn from hole 24 so that it can be penetrated by pipe 23 to take its operative position shown in FIG. 1.

The embodiment shown in FIG. 5 is suitable for field installation of new or replacement seals to existing manhole installations. The seal of FIG. 5 is the same as that of FIGS. 1-3, except that flange 35 at outer margin 36 is provided with thickened rim 37 which is engageable by means of firm annulus 38 which in turn is attached to wall 25 by means of bolts 39. Bolts 39 are attached to wall 25 by countersinking them. Bolts 39 could penetrate wall 26 completely, if desired, but sealing of the holes would then be necessary.

The elastomeric sleeve may be made from a synthetic rubber such as neoprene or ethylene propelene that is highly resistant to raw sewage, ozone, acids and weathering. The preferred material for strap 28 is stainless steel while bolts 39 and annulus of FIG. 5 can be made of corrosion-resistant steel.

It will be understood by those familiar with sewerage design, storm drain design and/or the like, that wide deviations, could be made from preferred embodiments set forth herein, without departing from the main theme of invention set forth in the claims which follow.

I claim:

1. In combination a concrete manhole structure with a pipe having a generally cylindrically shaped outer surface and a circumferentially continuous elastomeric sleeve, the manhole structure having a wall provided with an opening through which a portion of the pipe is inserted, the sleeve having a first end pipe, clamped sealed relationship to the outer surface of the pipe, the sleeve having a second end with an outwardly flared flange formed thereon and projecting radially outwardly therefrom, the portion of said pipe within said opening being free of bearing contact with said sleeve, means for attaching the flange in sealed engagement to the wall and concentric with said opening.

2. The combination of claim 1 with the means for attaching the flange in sealed engagement to the wall comprising:

the flange formed with an outer margin having a continuous thickened rim, a rigid annulus engageable over the outer margin and having a continuous bearing surface which compresses the thickened rim, a plurality of bolts connected between the annulus and the wall for drawing the annulus to the wall.

3. In combination a concrete manhole structure with a pipe having a generally cylindrically shaped outer surface and an elastomeric sleeve, the manhole structure having a wall provided with an opening through which the pipe is inserted, the sleeve having a first end in clamped sealed relationship to the outer surface of the pipe, the sleeve having a second end with an outwardly flared flange formed thereon and projecting radially outward therefrom, the flange sealably cast into the concrete wall concentric with the opening.

4. The seal of claim 3 and the flange provided with corrugations to improve its bond and seal to the concrete wall.

5. In combination a concrete manhole structure with a pipe having a generally cylindrically shaped outer surface and a sleeve, the manhole structure having a wall provided with an opening through which the pipe is inserted, the sleeve having a first end in clamped sealed relationship to the outer surface of the pipe, the sleeve having a second end with an outwardly flared flange formed thereon and projecting radially outwardly therefrom so that the flange can be sealably cast into the concrete wall concentric with the opening, the sleeve made of an elastomeric material whereby it can be positioned within the opening while the wall is being poured, the flange provided with corrugations to improve its bond and seal to the concrete wall.

* * * * *

UNITED STATES PATENT OFFICE
CERTIFICATE OF CORRECTION

Patent No. 3,759,280         Dated September 18, 1973

Inventor(s) Harold V. Swanson

It is certified that error appears in the above-identified patent and that said Letters Patent are hereby corrected as shown below:

Column 1, line 62, before "concrete" insert the word -- the --.

Column 2, line 39, "embbodiment" should read -- embodiment --

Column 2, line 57, delete "underground", start a new paragraph with "As seen best".

Claim 1, line 8, delete "pipe," and insert the word -- in --.

Signed and sealed this 26th day of March 1974.

(SEAL)
Attest:

EDWARD M. FLETCHER, JR.
Attesting Officer

C. MARSHALL DANN
Commissioner of Patents